United States Patent [19]
Obata et al.

[11] Patent Number: 5,212,558
[45] Date of Patent: May 18, 1993

[54] USING THERMALLY TRANSFERRED INVISIBLE INK DETECTABLE BY EXPOSURE TO INVISIBLE LIGHT OF SPECIFIC WAVELENGTH

[75] Inventors: Kenzo Obata, Okazaki; Masakazu Sugano, Obu, both of Japan

[73] Assignee: Nippondenso Co., Ltd., Kariya, Japan

[21] Appl. No.: 659,962

[22] Filed: Feb. 26, 1991

[30] Foreign Application Priority Data

Feb. 26, 1990 [JP] Japan .................. 2-45271
Feb. 21, 1991 [JP] Japan .................. 3-27556

[51] Int. Cl.$^5$ .................. H04N 1/23; H04N 1/44; G09C 5/00; B41J 2/325
[52] U.S. Cl. .................. 358/296; 346/76 PH; 283/91; 380/18; 380/54
[58] Field of Search .................. 358/296, 401, 475; 346/76 PH; 380/18, 54; 283/91

[56] References Cited

U.S. PATENT DOCUMENTS 4,504,084 3/1985 Jauch .................. 283/91
4,914,700 4/1990 Alasia .................. 380/54

FOREIGN PATENT DOCUMENTS 63-24588 5/1988 Japan .

Primary Examiner—Benjamin R. Fuller
Assistant Examiner—Scott A. Rogers
Attorney, Agent, or Firm—Cushman, Darby & Cushman

[57] ABSTRACT

In a facsimile machine which receives transmit data based on an original that is transmitted from a facsimile transmit machine through a telephone line at its data scrambler and which records an image of the original that is transmitted by decoding the received transmit data on recording paper at its thermal transfer printer portion, in order to maintain the secrecy of the original until the recording paper is delivered to an intended receiver by making it impossible to read the recording paper itself on which the transmit data is recorded and outputted, an image by invisible ink is recorded on the recording paper. Also, the image by the invisible ink which is recorded on the recording paper is displayed by converting it to a visible image by means of a visual observation apparatus, so that only a predetermined person can read the recording paper.

11 Claims, 6 Drawing Sheets

USING THERMALLY TRANSFERRED INVISIBLE INK DETECTABLE BY EXPOSURE TO INVISIBLE LIGHT OF SPECIFIC WAVELENGTH

BACKGROUND OF THE INVENTION

1. Field of the Invention

The present invention relates to a facsimile machine with secrecy protection function which can protect the secrecy of information which is received and recorded on recording paper.

2. Description of the Prior Art

In a conventional machine, when transmit data according to an original which is transmitted from a facsimile transmission machine is received, the same image as that of the original is recorded on recording paper.

However, with the conventional facsimile machine, no matter how secret the original is, an image is recorded on the recording paper which can be seen by anyone. There is no way of telling operators on the receiving side of the secrecy, and accordingly, the secrecy of the original can not possibly be protected. Especially, in the present state of the spread of facsimile machines, it is still often the case that one facsimile machine is commonly used by a plurality of departments, sections, or divisions. Accordingly, there is a problem that secret information, the secrecy of which should be maintained against other departments, sections, or divisions, can not be sent by a facsimile machine.

In order to solve the problem as referred to above, conventionally a machine has been proposed with which recording paper is distributed among a plurality of recording paper storing boxes according to the address of the receiver such a device is disclosed in Japanese examined patent No. 63-24588. Even with this machine, there are the following problems: (1) since a plurality of recording paper storing boxes among which recording paper is distributed are necessary, the size of the machine becomes that much bigger, which is not suitable for miniaturization of the machine and which follows a rise in the cost; (2) in order to distribute the recording paper, it is necessary that address identification data is added to the data; (3) in order to protect the secrecy of the information, it is indispensable that a representative of each department, section, or division goes to the recording paper storing box and fetches recording paper, etc.

SUMMARY OF THE INVENTION

The present invention is made in view of the problems as above referred to. The first object of the present invention is to make recording paper on which information is recorded and outputted unable to be read in order to protect the secrecy of the information until the recording paper is delivered to the addressed receiver.

In order to achieve the first object, a facsimile machine having secrecy protection function of the present invention comprises receiving means for receiving transmit data based on an original which is transmitted from a facsimile transmission machine and recording means for recording on recording paper the image of the original based on the transmit data received by the receiving means, wherein said recording means comprises means for recording the image by the invisible ink on the recording paper.

The second object of the present invention is to display the image recorded on the recording paper as a visible image.

In order to achieve the second object, a facsimile machine of the present invention comprises visual observation means for converting the image by the invisible ink to a visible image and for displaying the visible image.

DETAILED DESCRIPTION OF THE PREFERRED EMBODIMENT

Figure 1:
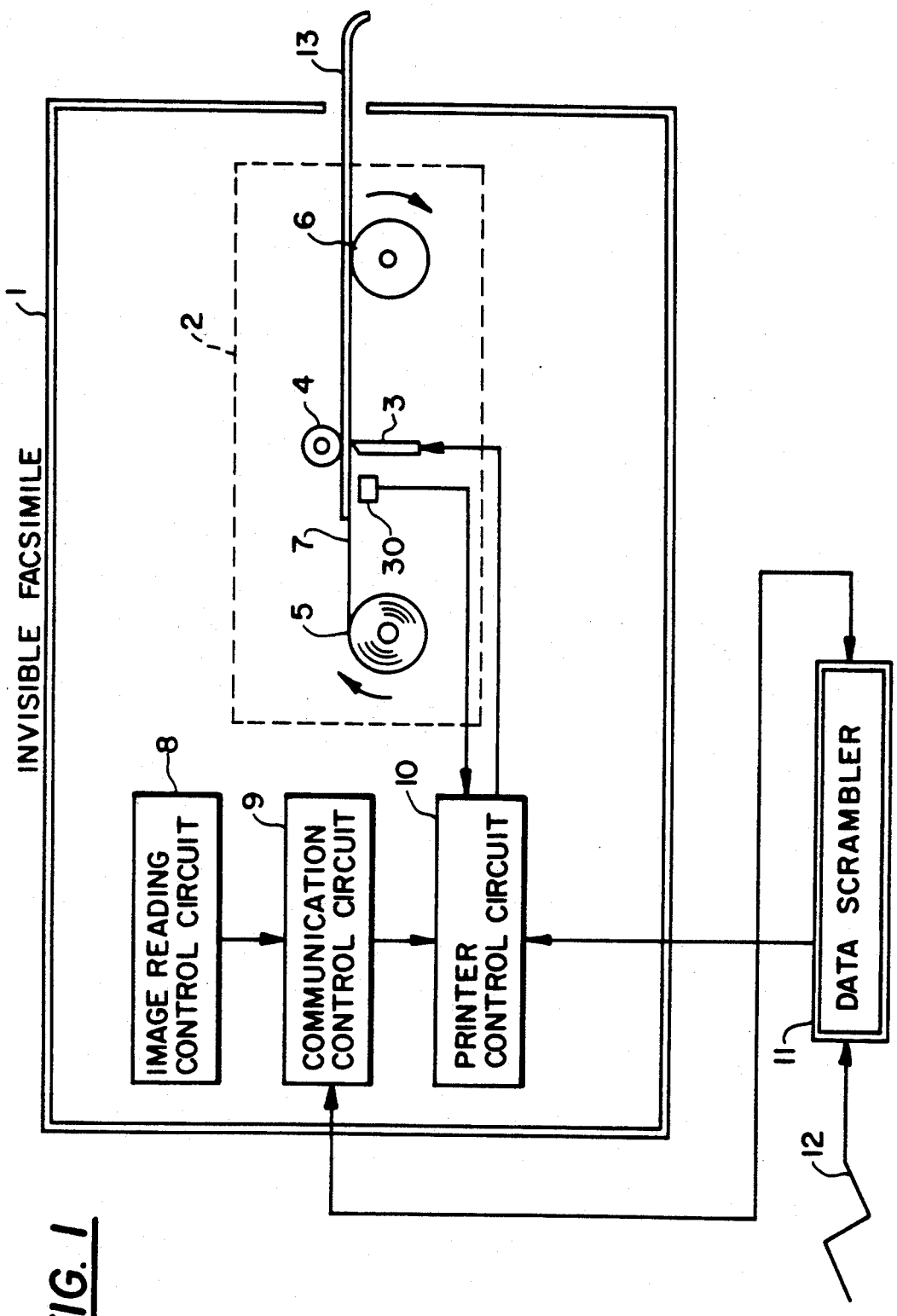
FIG. 1 is a view which shows an outline of a facsimile machine with secrecy protection function as an embodiment of the present invention.

The present invention is described in the following by means of the embodiments which are shown in the drawings. FIG. 1 is a view which shows an outline of a facsimile machine with secrecy protection function as an embodiment of the present invention. In FIG. 1, an invisible facsimile body 1 has a thermal transfer printer portion 2, an image reading control circuit 8, a communication and system control circuit (hereinafter simply referred to as communication control circuit) 9, and a printer control circuit 10, and the invisible facsimile body 1 is connected with a data scrambler 11 and a telephone line 12 which are outside the invisible facsimile machine body 1.

The arrangement of the above elements is described in the following. First, the thermal transfer printer portion 2 has an inline type thermal head 3, a rotatable platen 4 which is in contact with the thermal head 3 with appropriate pressure, thermal transfer film 7, a roll 5 of the thermal transfer film 7, and a film winding roll 6 for spent film. The thermal head 3 is made to generate heat according to a picture signal of the printer control circuit 10 and records information on recording paper 13 which recording paper 13 is sandwiched between the platen 4 and the thermal transfer film 7 with ink disposed on the surface of the thermal transfer film 7. The recording paper 13 may be plain paper, but as thermal transfer is conducted on it, it is preferable that the surface of the recording paper 13 is smooth.

Figure 2:
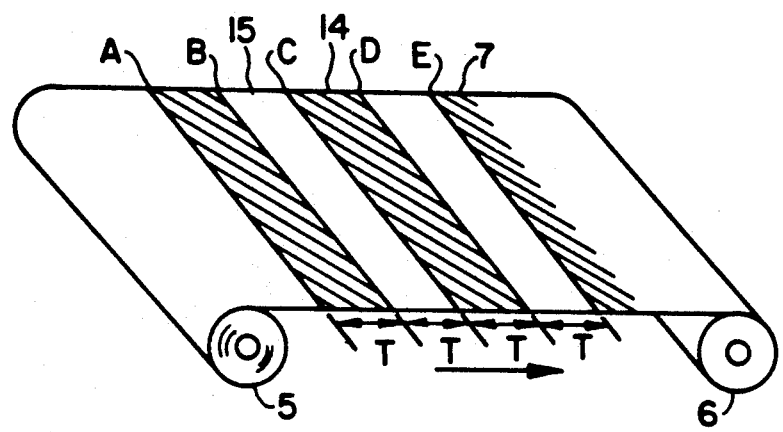
FIG. 2 is an explanatory perspective view of thermal transfer film of the embodiment which is shown in FIG. 1 of the present invention.

On the thermal transfer film 7 of the present embodiment, as shown in a perspective view FIG. 2, visible ink portion 14 which is made of black ink, etc. and invisible ink portion 15 which is made of fluorescent substance ink, etc. are alternatively disposed and formed in the subscan direction of the film. The width of each ink portion is at least the width of the recording head in the subscan direction of the thermal head 3.

The image reading control circuit 8 is used when transmit data is transmitted by the facsimile machine as a facsimile transmission machine, or when transmit data is printed for the purpose of making its copy. The image reading control circuit 8 converts a light signal in an electric signal with, for example, a CCD.

The communication control circuit 9 decodes a signal which is restored by the data scrambler 11 into a picture signal by a facsimile communication procedure which is provided by CCITT (International Consultative Committee for Telephone and Telegraph) and outputs the picture signal to the printer control circuit 10.

The printer control circuit 10 receives the picture signal from the communication control circuit 9 and controls the timing for supplying a heat generate signal to the thermal head 3, data format applied voltage, feeding of the thermal transfer film 7, feeding of the recording paper 13, etc.

The data scrambler 11 encodes and decodes the data by a predetermined operation. The data scrambler 11 conducts a normal decoding operation only when the key information which is decided on by the sending side and that by the receiving side of the data coincide with each other. When the key information on the sending side does not coincide with the key information on the receiving side, no signal is outputted, or, a signal with no normal decoding operation is outputted. Technology with respect to such a data scrambler is, for example, disclosed in U.S. Department of Commerce/National Bureau of Standards, "Data Encryption Standard,"

FIPS-PUB-46, Jan., 1977. As the system of conducting decoding operation by the coincidence of the key information, for example, DES (Data Encryption Standard) system, FEAL (Fast data Encipherment Algorithm) system, and RSA (Rivest, Shamirand Adleman) system are known.

Next, the operation of a machine of the above arrangement is now described. A facsimile signal which is transmitted by the telephone line 12 is inputted to the data scrambler 11. At the data scrambler 11, the signal is decoded subject to a predetermined key information, and the decoded signal is inputted to the communication control circuit 9. At the communication control circuit 9, as referred to above, signals for conducting various kinds of control according to the decoded signal are transmitted to the thermal transfer printer circuit 2 through a printer control circuit 10. Especially, to the thermal head 3, a picture signal with its printing conditions prepared for thermal transfer recording is transmitted. The thermal head 3 generates heat when the picture signal exists. At that time, by the pressure which is applied between the thermal head 3 and the platen 4, an image by the visible ink portion 14 or by the invisible ink portion 15 which ink portions 14 and 15 are on the thermal transfer film 7 is transferred to the recording paper 13. After a recording operation for one line is finished, the printer control circuit 10 operates the film winding roll 6 and the paper feed roll 5 in preparation for another recording.

Here, in the present invention, as described with reference to FIG. 2, the visible ink portion 14 and the invisible ink portion 15 are alternatively disposed in the subscan direction of the thermal transfer film 7, and accordingly, in case the visible ink portion 14 is disposed on the thermal head 3, when the thermal head 3 generates heat, visible ink is transferred to the recording paper 13, and in case the invisible ink portion 15 is disposed on the thermal head 3, when the thermal head 3 generates heat, invisible ink is transferred to the recording paper 13.

For example, if the physical relationship between the thermal head 3 and each of the ink portions is controlled so that, as shown in FIG. 2, the recording may begin at a position shown as A, the film may be wound by T, which is the width of each of the ink portions in the subscan direction when the thermal head 3 comes to a position shown as B , and the recording may begin again at a position shown as C, in spite of the disposition of different kinds of ink, that is, invisible ink and visible ink, on the thermal transfer film 7, only the visible ink is transferred to the recording paper 13. On the contrary, if the physical relationship between the thermal head 3 and each of the ink portions is controlled so that the recording may begin at the position shown as B , the film may be wound by T when the thermal head 3 comes to the position shown as C , and the recording may begin again at a position shown as D, only invisible ink is transferred to the recording paper 13.

Figure 3B:
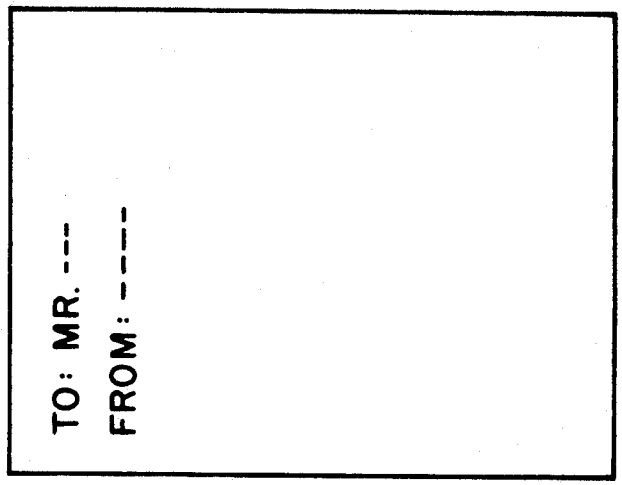
FIGS. 3A and 3B are views which show a state of an original on a sending side and of recording on a receiving side, respectively.
Figure 3A:
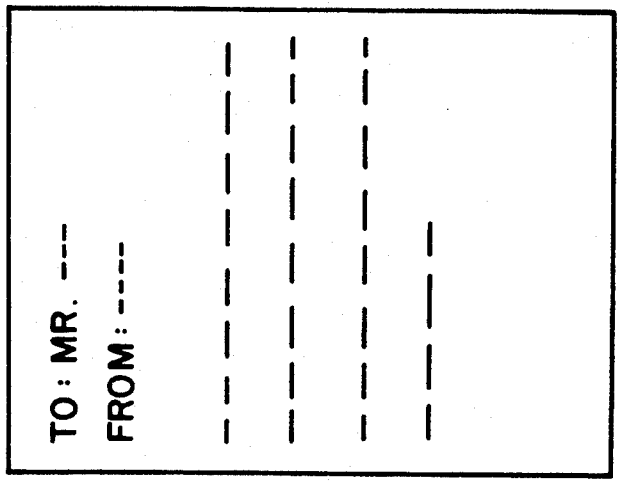

As shown in FIGS. 3A and 3B, if the physical relationship of information the secrecy of which should be maintained and information which is not a secret, for example, the name of the addressed receiver of the original, the date of transmit, the name of the sender, is clarified by writing on the sending side of an original the information which is not a secret in a specific area of the original (for example, in the area which is within several centimeters from the upper end of the original), the information which is not a secret can be recorded with visible ink and the information the secrecy of which should be maintained can be recorded with invisible ink by controlling the positions where visible ink should be transferred and the positions where invisible ink should be transferred.

Here, in order to have the information the secrecy of which should be maintained recorded with invisible ink, information which indicates that the secrecy of the data should be maintained is included in the facsimile signals which are transmitted through the telephone line 12. The communication control circuit 9 judges whether the decoded signal is of data the secrecy of which should be maintained or not by the existence or nonexistence of the information which indicates that the secrecy of the data should be maintained, and after adding information as to whether there is data the secrecy of which should be maintained or not, transmits picture signals for one line to the printer control circuit 10.

Figure 4:
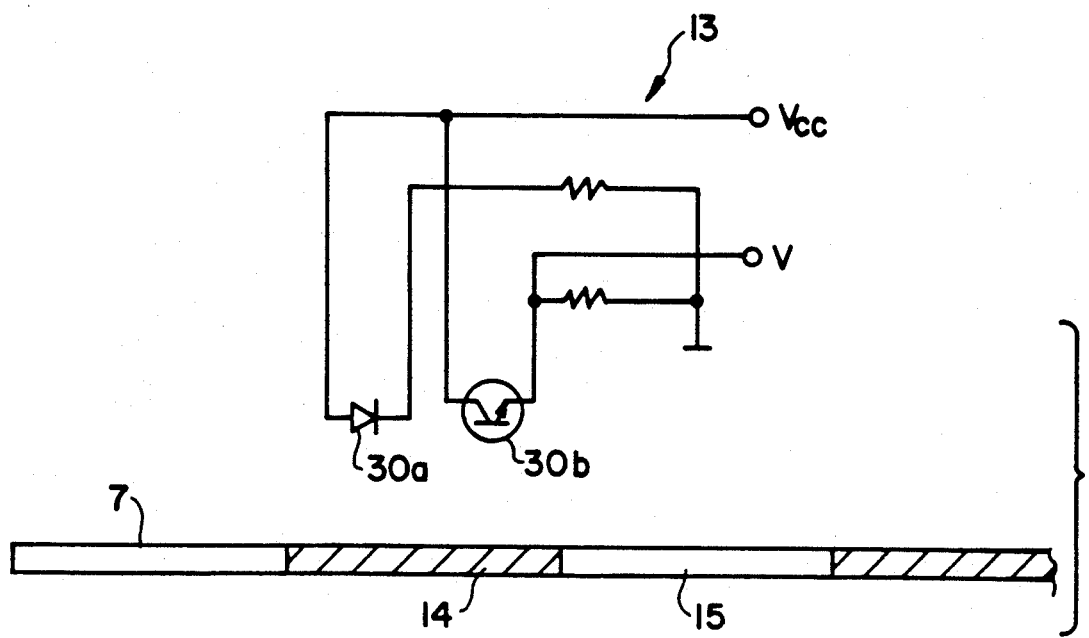
FIG. 4 is a detail circuit diagram of a reflection type sensor which is disposed so as to face thermal transfer film 7.

In order to discriminate the visible ink portion 14 and the invisible ink portion 15 from each other at the thermal transfer printer portion 2, in the present embodiment, a reflection type sensor 30 is disposed so as to face the thermal transfer film 7. The reflection type sensor 30 detects whether there is visible ink or not. FIG. 4 shows an example of the reflection type sensor 13. In FIG. 4, the reflection type sensor 30 has a light emitting diode 30a and a phototransistor 30b both of which face the thermal transfer film 7. The phototransistor 30b detects whether there is light or not which is emitted from the light emitting diode 30a and reflected at the thermal transfer film 7, and output voltage V is generated. That is, when the light is reflected at a portion of visible ink, as the reflected light is faint, the output voltage V is L level. On the other hand, when the light is reflected at a portion of invisible ink, as there occurs substantial absorption of light and as the level of the reflected light is more than a predetermined value, the output voltage V is H level. The sensor for detecting whether there is visible ink or not is not limited to one of reflection type, but one of transmission type may also be used.

Figure 5:
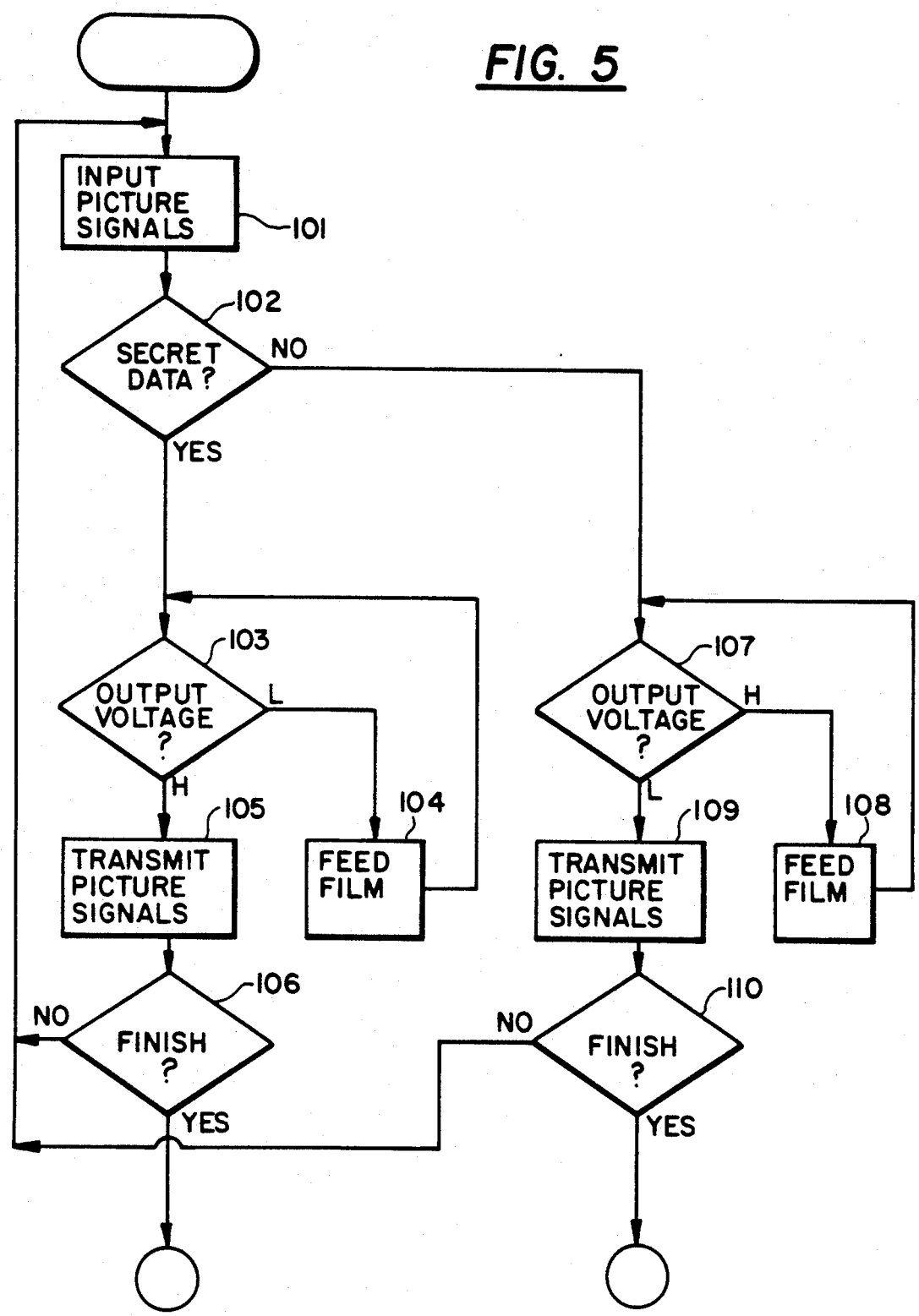
FIG. 5 is a flow chart which shows process at a printer control portion.

Next, an embodiment with the reflection type sensor 30 is described in the following which embodiment records information using selectively the visible ink portion 14 and the invisible ink portion 15 according to the content of the information to be recorded. FIG. 5 is a flow chart which shows a process at the printer control circuit 10. The printer control circuit 10, as shown in FIG. 5, first, inputs picture signals for one line from the communication control circuit 9 at a step 101. Based on the inputted signals, whether there is data the secrecy of which should be maintained or not is judged. When it is judged that there is data the secrecy of which should be maintained, the flow goes to a step 103, and the level of the output voltage V from the reflection type sensor 13 is judged. When the output voltage V is L level, the flow goes to a step 104 which controls the rolls 5 and 6 to feed the thermal transfer film 7 by a predetermined distance. After that, when the output voltage V has becomes H level, the flow goes t a step 105 which transmits picture signals for one line to the thermal head 3 in order to print the image on the invisible ink portion 15. At the step 105, before the transmission of the picture signals, the thermal transfer film 7 is advanced by a predetermined distance between a detecting position of the thermal transfer film 7 by the reflection type sensor 30 and a position to be printed by the thermal head 3. The process as referred to above is repeated until transmission of the whole picture signals which correspond facsimile signals that are transmitted through the telephone line 12 is finished. When the transmission of the whole picture signals is finished, the result of judgement at a step 106 becomes YES and the whole process which is shown in FIG. 5 is finished.

On the other hand, when it is judged that the data is not a secret, the flow goes to the process at steps 107 through 110 (which correspond to the steps 103 through 106 as referred to above). When the output voltage V from the reflection type sensor 30 has become L level, picture signals for one line are transmitted to the thermal head 3 in order to print the image on the visible ink portion 14. It should be noted that the thermal transfer film 7 is advanced by a predetermined distance between the detecting position of the thermal transfer film 7 by the reflection type sensor 30 and the position to be printed by the thermal head 3 before the transmission of the picture signals as described above.

Accordingly, by conducting the process which is shown in FIG. 5, recording of information can be conducted using selectively the visible ink portion 14 and the invisible ink portion 15 according to the content of the information to be recorded.

As the constituents of visible ink of the visible ink portion 14, the same kinds of constituents of a thermal transfer ribbon of a normal printer, etc. can be adopted, and generally, visible ink the chief constituent of which is carbon black is used. As invisible ink of the invisible ink portion 15, one the chief constituent of which is fluorescent substance can be adopted, and made up of, for example, organic fluorescent substance (thioflavine, fluorescein, eosin, rhodamine 6G, etc.). In particular, in the present embodiment, for the reason which is described in the following, invisible ink made up of constituents with which the emission wave length of the fluorescent substance is, when light the wave length of which is 250 nm is irradiated, 360–380 nm. Further, the invisible ink is, in a normal state, substantially transparent and whether the ink exists or not can not be told with the naked eye. In the present invention, "invisible ink" means ink the existence or non-existence of which can not be told with the naked eye when the ink is transferred to recording paper.

Therefore, according to the present embodiment, as an image of information the secrecy of which should be maintained can be recorded on recording paper by invisible ink, the information which is recorded on the recording paper can not be easily read except by a person who has an apparatus like a visual observation apparatus which is described in the following with which apparatus what is recorded with the invisible ink can be confirmed. Accordingly, when transmit data is received through a facsimile machine, even if the recording paper on which the transmit data is recorded is delivered to a person who is not the intended receiver, the secrecy of the information is maintained until the recording paper is delivered to the intended receiver.

In addition, according to the present embodiment, as the result of printing of information the secrecy of which should be maintained can not be seen by the naked eye even with respect to the thermal transfer film 7 which is wound on the film winding roll 6, problems such as leakage of information by the film winding roll 6's being passed into other hands than those of the intended receiver can be prevented as much as possible.

Further, according to the arrangement of the present embodiment, no additional elements such as recording paper storing boxes which are disclosed in Japanese Patent Publication No. SHO 63-24588 which is referred to above are necessary, and as all which should be done is to dispose invisible ink on the thermal transfer film 7, the miniaturization of the machine compared with a prior art machine can be carried out that much more. Also, it is not necessary to add address identification data to the transmit data, and anybody can come to the machine to take the recording paper. It is needless to say that a facsimile machine may be arranged by combining the technical idea of the present embodiment with the technical idea which is disclosed in Japanese examined patent No. 63-24588.

In the way described above, recording paper on which an image with invisible ink is recorded is supplied. In order for the intended receiver to confirm the information which is recorded on the recording paper, a visual observation apparatus for the invisible ink is necessary. This visual observation apparatus is described in the following.

Figure 6:
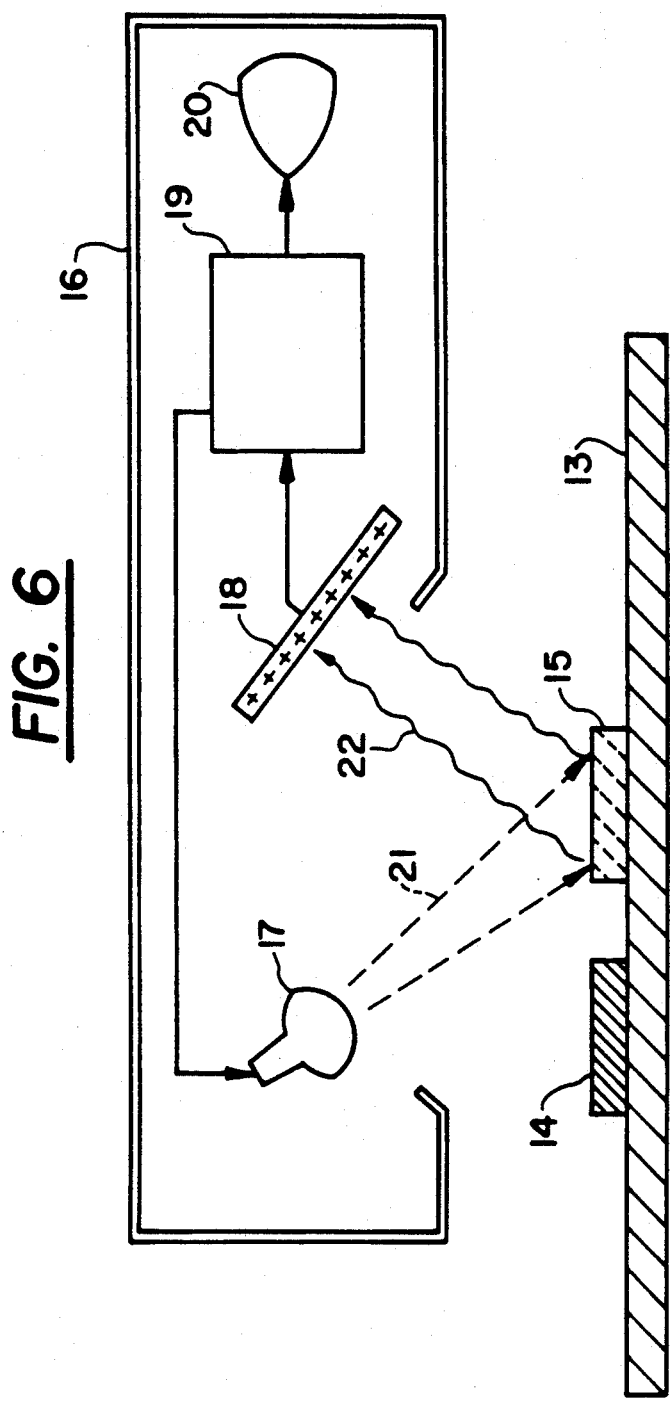
FIG. 6 is a view which shows an outline of a visual observation apparatus which apparatus displays an image that is recorded on recording paper by invisible ink by means of the facsimile machine which is shown in FIG. 1 by converting the image to a visible image.

FIG. 6 is a view which shows an outline of a visual observation apparatus of an embodiment of the present invention. The visual observation apparatus has a light source 17, a sensor 18, a control device 19 and a display device 20. The light source 17 emits light 21 the wave length of which is about 250 nm, and is, for example, a black light. The sensor 18 selectively detects the light which is reflected by the invisible ink 15 on the recording paper 13 and converts it to an electric signal, and is, for example, an image sensor such as a CCD. The control device 19 is for the purpose of conducting process and controlling such as amplifying process or data generation for displaying after receiving the electric signal for the image which is detected by the sensor 8, and of outputting the result to the display device 20 which display device 20 displays the image. The display device 20 may be, for example, a liquid cristal display, a CRT display, or a printer which conducts printing on recording paper with visible ink.

When light the wave length of which is about 250 nm is emitted from the light source 16 toward the recording paper 13, at the portion of invisible ink on the recording paper, fluorescent substance which is a constituent of the invisible ink is activated and light 22 the wave length of which is 360–380 nm is emitted. As light of this wave length range is invisible to the naked eye of human being, the light is detected by means of the sensor 18 which can detect light of only this wave length range. As only the invisible ink which forms an image on the recording paper 13 reacts in this way, the image by the invisible ink is displayed as it is by the display device 20.

With this visual observation apparatus, an image by invisible ink which image is recorded on recording paper can be seen. Therefore, if this visual observation apparatus is used together with the facsimile machine with secrecy protection function which is referred to above and which is shown in FIGS. 1 and 2, when the visual observation apparatus is given to only the intended receiver, there is an effect that information the secrecy of which should be maintained is leaked to nobody else.

A facsimile machine with secrecy protection function and a visual observation apparatus which is used together with the facsimile machine of the present invention are described above using an embodiment, respectively. However, the present invention is not limited to the embodiments, and various kinds of modifications, for example, ones which are shown in the following are possible which fall within the spirit of the present invention.

Figure 7:
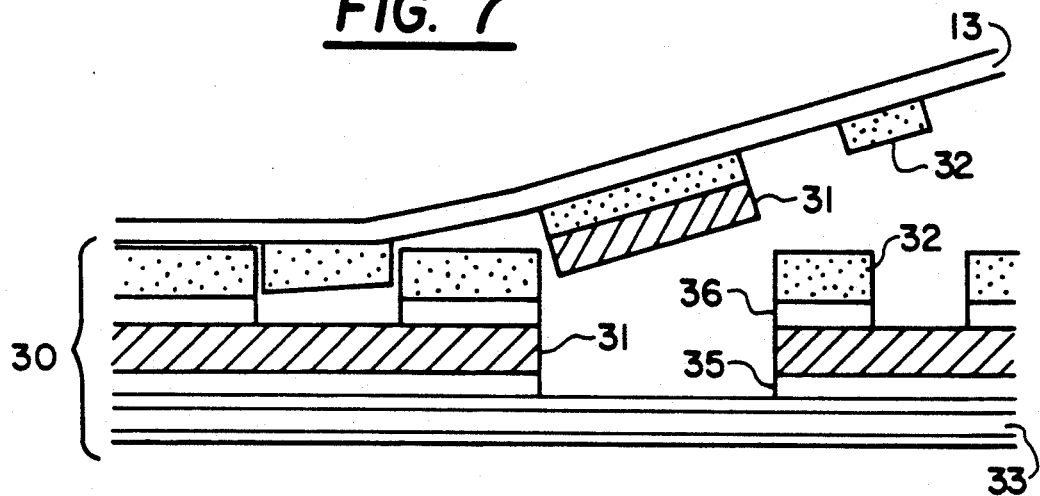
FIG. 7 is a sectional view of recording paper and thermal transfer film of another embodiment of the present invention.

(1) The thermal transfer film 7 which is used in the facsimile machine with secrecy protection function that is shown in FIG. 1 may be arranged as shown in a sectional view FIG. 7. Thermal transfer film 30 of the present embodiment is characterized in that it has a multilayer structure made of a visible ink portion 31 and an invisible ink portion 32. A first separating layer 35 intervenes between a film base 33 and the visible ink portion 31. A second separating layer 36 intervenes between the visible ink portion 31 and the invisible ink portion 32. The melting temperature of the separating layer 35 is set to be different from and more particularly, to be higher than that of the separating layer 36.

According to the present embodiment, when heat which is generated by the thermal head 3 is relatively of small value, that is, in case the temperature of the thermal head 3 is higher than the melting temperature of the separating layer 36 but lower than the melting temperature of the separating layer 35, only the invisible ink portion 32 is transferred to the recording paper 13. On the other hand, when heat which is generated by the thermal head 3 is relatively of large value, that is, in case the temperature of the thermal head 3 is higher than the melting temperature of the separating layer 35, the visible ink portion 31 together with the invisible ink portion 32 is transferred to the recording paper 13. Therefore, only by controlling the temperature of the thermal head 3, visible ink and invisible ink can be selectively transferred to the recording paper 13. In this case, there is an effect that the thermal transfer film 30 can be used efficiently. Further, in the present embodiment, as controlling is not necessary such as positioning or winding of the thermal transfer film 7 in order to select portions where the visible ink portion 14 or the invisible ink portion 15 is formed like in the embodiment shown in FIG. 1, the control becomes easier that much. As for the embodiment shown in FIG. 1, as it is not necessary to use, as in the present embodiment, the thermal transfer film 30 the structure of which is complicated, there is an effect that the thermal transfer film 7 to be used can be made at a low cost.

Figure 8:
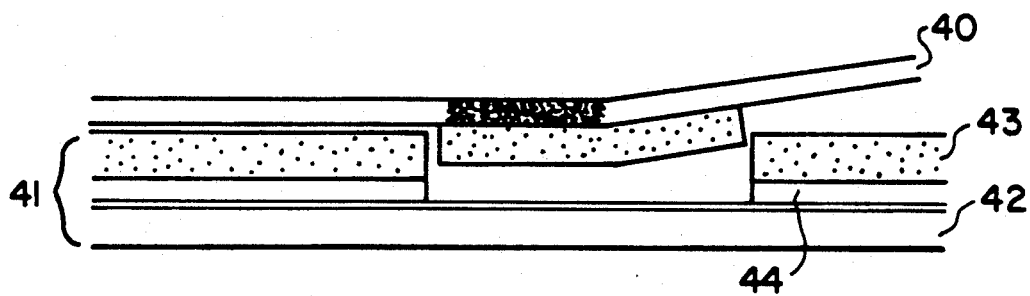
FIG. 8 is a sectional view of thermosensible recording paper and thermal transfer film of still another embodiment of the present invention.

(2) Also, the recording paper 13 and the thermal transfer film 7 which are used in the facsimile machine with secrecy protection function that is shown in FIG. 1 may be arranged as in a sectional view FIG. 8. Recording paper which is used in the present embodiment is thermosensible recording paper 40. Invisible ink 43 is formed all over a thermal transfer film 41. A separating layer 44 intervenes between a film base 42 and the invisible ink 43. The melting temperature of the separating layer 44 is set to be lower than the coloring temperature of the thermosensible recording paper 40.

According to the present embodiment, when the temperature of the thermal head 3 is higher than the melting temperature of the separating layer 44 and lower than the coloring temperature of the thermosensible recording paper 40, the thermosensible recording paper 40 does not color and the invisible ink 43 is transferred to the thermosensible recording paper 40. When the temperature of the thermal head 3 is higher than the coloring temperature of the thermosensible recording paper 40, the invisible ink 43 is transferred to the thermosensible recording paper 40 in the same way, but as the thermosensible recording paper 40 colors at the same time, the invisible ink 43 becomes visible. In the present embodiment also, there is an effect that the thermal transfer film 41 can be used efficiently.

In the embodiments shown in FIGS. 2, 7, and 8, both visible information and invisible information can be recorded on the recording paper, but in the present invention, it may be that at least invisible information can be recorded.

(3) In the embodiment which is shown in FIG. 1, the thermal transfer printer portion 2 is used as means for transferring invisible ink to the recording paper. Instead, as the printer portion, one of ink jet system or electrophotographic system, for example, using laser, can be adopted. According to these systems, it is necessary to prepare a printer mechanism for invisible ink and another printer mechanism for visible ink, which results in high cost. On the other hand, when the thermal transfer system is adopted, as one arrangement is used both for invisible ink and visible ink, the arrangement can be simplified that much more, and therefore, the thermal transfer system is advantageous from this point of view.

(4) The data scrambler 11 is used in the embodiment which is shown in FIG. 1 which data scrambler 11 is for the purpose of maintaining the secrecy of information when it is transmitted from the facsimile transmission machine to the facsimile receiving machine. However, the data scrambler 11 is not an indispensable element in the present invention. Or, the data scrambler 11 may be built in the invisible facsimile body 1.

(5) In the embodiments which are described above, only one kind of invisible ink is used. However, several kinds of invisible ink may be used. In this case, it is preferable that the respective kinds of ink emit lights the wave length of which lights differ from each other when light of a predetermined wave length is applied. With the present embodiment, for example, when the visual observation apparatus which is described above is used, by preparing a plurality of visual observation apparatus the sensor 18 of each of which detects only light of specific wave length of its own, if the plurality of visual observation apparatus are in advance given to a plurality of people, only those who have the visual observation apparatus with the sensor 18 which detects light that is emitted from a specific invisible ink can confirm information which is transmitted. In this case, data for selecting invisible ink may be included in the transmit data.

Further, if the visual observation apparatus is provided with a plurality of light sources 17 each of which emits light of different wave length, or with a light source 17 the wave length of light emitted from which can be changed so that a user of the visual observation apparatus may select the wave length of the light which is emitted from the light source(s), only those who know which wave length of light from the light source(s) 17 is for the detection of the invisible ink can be informed of the information which is recorded with the invisible ink, which maintains the secrecy of information that much more. In this case, it is necessary to adjust the light source 17 and the sensor 18 of the visual observation apparatus so that each kind of the lights which are emitted from a plurality of kinds of invisible ink may be detected. It may be that data for selecting the invisible ink and data for selecting the wave length of the light which is emitted from the light source(s) 17 accordingly is included in the transmit data.

What is claimed is:

1. A secrecy-protected facsimile machine comprising:
   receiving means for receiving transmit data based on an original which is transmitted from a facsimile transmission machine; and
   recording means for recording an image of said original on a recording paper using invisible ink based on the transmit data received by the receiving means, wherein said recording means comprises:
   thermal transfer film on which the invisible ink is disposed,
   a thermal transfer printer having a thermal head which records an image by transferring the invisible ink onto the recording paper by applying heat to said thermal transfer film,
   moving means for moving said thermal transfer film with respect to said thermal head, and
   control means for transmitting a signal for generating heat to said thermal head according to said transmit data.

2. The facsimile machine according to claim 1, wherein said transfer film comprises an invisible ink portion and a visible ink portion.

3. The facsimile machine according to claim 2, wherein said invisible ink portion and said visible ink portion are alternatively disposed on said thermal transfer film.

4. The facsimile machine according to claim 2, wherein said thermal transfer film has a multilayer structure of an invisible ink layer and a visible ink layer and a separating layer intervening between said two ink layers, an image either of the invisible ink or of the visible ink being recorded depending on whether a temperature of said thermal head is higher than a melting temperature of said separating layer.

5. The facsimile machine according to claim 1, wherein said thermal transfer film has a multilayered structure including a film base, a separating layer, the invisible ink, and thermosensitive recording paper, and an image of the invisible ink is recorded with a temperature of said thermal head is higher than a melting temperature of the separating layer but is lower than a coloring temperature of the thermosensitive recording paper and an image by coloring of the thermosensitive recording paper is recorded when a temperature of said thermal head is higher than a coloring temperature of the thermosensitive recording paper.

6. The facsimile machine according to claim 2, wherein said recording means comprises detecting means for detecting where the invisible ink and visible ink is disposed on the thermal transfer film and for producing a detecting signal, and
   said control means comprises means for determining secret information having secrecy which should be maintained according to the transmit data, and means for sending said signal for generating heat which corresponds to the transmit data to the thermal head based on said detecting signal.

7. The facsimile machine according to claim 6, wherein said control means comprises means for moving said thermal transfer film with respect to said thermal head based on said detecting signal until said thermal transfer film is positioned to a position for the image to be recorded by said invisible ink.

8. The facsimile machine according to claim 1 further comprising:
   visual observation means for converting the image recorded in the invisible ink into a visible image and for displaying the visible image.

9. A secrecy-protected facsimile machine comprising:
   receiving means for receiving transmit data based on an original which is transmitted from a facsimile transmission machine;
   recording means for recording an image of said original on a recording paper using invisible ink based on the transmit data received by the receiving means; and
   visual observation means for converting the image recorded in the invisible ink into a visible image and for displaying the visible image,
   wherein said visual observation means comprises:
   converting means for converting the image recorded in the invisible ink to an image of invisible light by irradiating the invisible ink with light of a predetermined wavelength,
   a sensor for detecting the invisible light of the image which is converted by the converting means, and
   displaying means for displaying an image in the invisible ink as a visible image based on the invisible light which is detected by the sensor.

10. A facsimile machine with a secrecy protection function comprising:
    receiving means for receiving transmit data based on an original which is transmitted from a facsimile transmission machine;
    recording means for recording an image of said original on a recording paper based on the transmit data received by said receiving means, said image being recorded by using one of visible ink and invisible ink, determining means for determining whether said transmit data indicates secret data or non-secret data; and control means for controlling said recording means to record said image using said visible ink if said determining means has determined said non-secrecy of data and for controlling said recording means to record said image with said invisible ink if said determining means has determined secrecy of data.

11. A facsimile machine according to claim 10 wherein:

said receiving means includes means for inputting said transmit data indicative of said image one line at a time; and said receiving means determines said secrecy of data using said transmit data indicative of said image one line at a time.

* * * * *